US010162848B2

(12) United States Patent
Mohan et al.

(10) Patent No.: US 10,162,848 B2
(45) Date of Patent: Dec. 25, 2018

(54) METHODS AND APPARATUS FOR HARMONIZATION OF DATA STORED IN MULTIPLE DATABASES USING CONCEPT-BASED ANALYSIS

(71) Applicant: uReveal, Inc., Jacksonville, FL (US)

(72) Inventors: Rengaswamy Mohan, Jacksonville, FL (US); Prashanth Palwai, Jacksonville, FL (US); Joshua Julian Yount, Jacksonville, FL (US)

(73) Assignee: uReveal, Inc., Jacksonville, FL (US)

( * ) Notice: Subject to any disclaimer, the term of this patent is extended or adjusted under 35 U.S.C. 154(b) by 225 days.

(21) Appl. No.: 14/736,938

(22) Filed: Jun. 11, 2015

(65) Prior Publication Data

US 2016/0004742 A1    Jan. 7, 2016

Related U.S. Application Data

(60) Provisional application No. 62/010,631, filed on Jun. 11, 2014.

(51) Int. Cl.
*G06F 17/30* (2006.01)

(52) U.S. Cl.
CPC .. *G06F 17/30371* (2013.01); *G06F 17/30303* (2013.01)

(58) Field of Classification Search
CPC ......... G06F 17/30572; G06F 17/30362; G06F 17/30171; G06F 17/5081; G06F 17/30303; G06F 17/30569; G06F 17/30321; G06F 17/30401; G06F 17/30581

USPC ....................................................... 707/694
See application file for complete search history.

(56) References Cited

U.S. PATENT DOCUMENTS

| | | | | |
|---|---|---|---|---|
| 6,463,429 | B1 * | 10/2002 | Geppert | ............... G06F 17/3056 |
| 7,194,483 | B1 | 3/2007 | Mohan et al. | |
| 7,949,728 | B2 * | 5/2011 | Rivette | ............. G06F 17/30011 |
| | | | | 709/203 |
| 8,375,008 | B1 | 2/2013 | Gomes | |
| 9,244,989 | B2 * | 1/2016 | Boross | .............. G06F 17/30572 |
| 9,245,243 | B2 * | 1/2016 | Mohan | ................... G06Q 10/06 |
| 2005/0283486 | A1 | 12/2005 | Lauterbach et al. | |
| 2006/0095466 | A1 | 5/2006 | Stevens et al. | |

(Continued)

OTHER PUBLICATIONS

International Search Report and Written Opinion for International Application No. PCT/2015/035315 dated Oct. 7, 2015.

(Continued)

*Primary Examiner* — Jean M Corrielus
(74) *Attorney, Agent, or Firm* — Keith G. Haddaway; Venable LLP

(57) ABSTRACT

In some embodiments, a data harmonization system can organize, classify, analyze and thus relate previously unrelated data stored in multiple databases and/or associated with different organizations. In such embodiments, the data harmonization system can relate such previously unrelated data sets to, for example, track trends, exceptions, inconsistencies, location, etc. such that determinations can be made based on such different and/or previously unrelated data sets. In such embodiments, the data harmonization system can be used to harmonize both structured data and/or unstructured data based on concept-based analysis.

20 Claims, 12 Drawing Sheets

(56) References Cited

U.S. PATENT DOCUMENTS

| | | | |
|---|---|---|---|
| 2010/0262620 A1* | 10/2010 | Mohan | G06Q 10/06 707/776 |
| 2011/0246229 A1 | 10/2011 | Pacha | |
| 2012/0221582 A1* | 8/2012 | Boross | G06F 17/30572 707/752 |
| 2012/0226974 A1 | 9/2012 | Mohan et al. | |
| 2013/0054512 A1 | 2/2013 | Ephrat et al. | |
| 2013/0124545 A1* | 5/2013 | Holmberg | G06F 17/30244 707/756 |
| 2013/0221082 A1* | 8/2013 | Botten | G06F 17/30 235/375 |
| 2016/0098466 A1* | 4/2016 | Mohan | G06Q 10/06 707/603 |
| 2017/0242629 A1* | 8/2017 | Kephart | G06F 3/0661 |
| 2017/0242893 A1* | 8/2017 | Kephart | G06F 17/30528 |
| 2017/0316066 A1* | 11/2017 | Mohan | G06Q 10/06 |

OTHER PUBLICATIONS

Extended European Search Report for International Application No. PCT/US2015/035315 dated Nov. 3, 2017.

* cited by examiner

401

Database 310

|   | Report ID (410) | Characteristic (415) | Characteristic (420) | Characteristic (425) |
|---|---|---|---|---|
| 1 | AAAA | f | ff | fff |
| 2 | BBBB | g | gg | ggg |
| 3 | CCCC | h | hh | hhh |
| 4 | DDDD | i | ii | iii |
| 5 | EEEE | j | jj | jjj |

402

Database 320

|   | Database Pointer (430) | File Name (435) | Characteristic (440) | Characteristic (445) | Characteristic (450) |
|---|---|---|---|---|---|
| 1 | 1100 | AAAA.pdf | a | aa | aaa |
| 2 | 2200 | BBBB.pdf | b | bb | bbb |
| 3 | 3300 | CCCC.pdf | c | cc | ccc |
| 4 | 4400 | DDDD.pdf | d | dd | ddd |
| 5 | 5500 | EEEE.pdf | e | ee | eee |

403

Database 330

|   | Database Pointer (455) | Characteristic (460) | Characteristic (465) | Characteristic (470) |
|---|---|---|---|---|
| 1 | 1100 | k | kk | kkk |
| 2 | 2200 | l | ll | lll |
| 3 | 3300 | m | mm | mmm |
| 4 | 4400 | n | nn | nnn |
| 5 | 5500 | o | oo | ooo |

Database 610

|   | Report ID (710) | Employee Name (715) | Fraud (720) | Branch Office of Audit Agency (725) |
|---|---|---|---|---|
| 1 | Contract1 | Joseph M. | Y | Reston, VA |
| 2 | Contract2 | Dave Z. | N | Las Vegas, NV |
| 3 | Contract3 | John H. | Y | Miami, FL |
| 4 | Contract4 | Mandy J. | N | Philadephia, PA |
| 5 | Contract5 | Irene A. | N | Reston, VA |

702

Database 620

|   | Database Pointer (730) | File Name (735) | Date of Award (740) | Award Amount (745) | Location of Implementation (750) |
|---|---|---|---|---|---|
| 1 | 1111 | Contract1.pdf | 01-23-2012 | $500,000 | Reston, VA |
| 2 | 2222 | Contract2.pdf | 02-23-2012 | $900,000 | Reno, NV |
| 3 | 3333 | Contract3.pdf | 03-23-2012 | $700,000 | Orlando, FL |
| 4 | 4444 | Contract4.pdf | 04-23-2012 | $600,000 | Philadephia, PA |
| 5 | 5555 | Contract5.pdf | 05-23-2012 | $3,000,000 | Reston, VA |

703

Database 630

|   | Database Pointer (755) | Employee Name (760) | Fraud (765) | Branch Office of OIG (770) |
|---|---|---|---|---|
| 1 | 1111 | John D. | Y | Washington, DC |
| 2 | 2222 | Chris S. | N | Las Vegas, NV |
| 3 | 3333 | Alissa L. | N | Miami, FL |
| 4 | 4444 | Robert N. | N | York, PA |
| 5 | 5555 | Nancy P. | Y | Washington, DC |

FIG. 7A

Concept C1: Branch office in greater Washington DC area

| 1111 | John D. | Y | Washington, DC |
|---|---|---|---|
| 5555 | Nancy P. | Y | Washington, DC |
| Contract1 | Joseph M. | Y | Reston, VA |
| Contract5 | Irene A. | N | Reston, VA |

810

Concept C2: Location of federal contract implementation is in greater Washington DC area

| 1111 | Contract1.pdf | 01-23-2012 | $500,000 | Reston, VA |
|---|---|---|---|---|
| 5555 | Contract5.pdf | 05-23-2012 | $3,000,000 | Reston, VA |

820

| Contract1 | Joseph M. | Y | Reston, VA | 1111 | Contract1.pdf | 01-23-2012 | $500,000 | Reston, VA |
|---|---|---|---|---|---|---|---|---|

| | | | | 1111 | | | | | John D. | Y | Washington, DC |

830

| Contract5 | Irene A. | N | Reston, VA | 5555 | Contract5.pdf | 05-23-2012 | $3,000,000 | Reston, VA |
|---|---|---|---|---|---|---|---|---|

| | | | | 5555 | | | | | Nancy P. | Y | Washington, DC |

Concept D1: Add "0" as prefix to Value (915) in Database 710

| Key (910) | Comments (925) | Value (915) | Prefix_Value (920) |
|---|---|---|---|
| 10001 | Comment 1 | 23056 | 01979879 |
| 10002 | Comment 2 | 398000 | 023056 |
| 10003 | Comment 3 | 1298809 | 0398000 |
| 10004 | Comment 4 | 439877 | 01298809 |

FIG. 8B

Concept D1: Add "0" as prefix to Value (915) in Database 710 = Prefix_Value (920) in Database 710

| Key (910) | Comments (925) | Value (915) | Prefix_Value (920) |
|---|---|---|---|
| 10002 | Comment 2 | 0398000 | 023056 |
| 10003 | Comment 3 | 1298809 | 0398000 |
| 10004 | Comment 4 | 439877 | 01298809 |
| 10005 | Comment 5 | 122333 | 0439877 |

905

Concept D2 = (Match comments column (925) in table 904 with the comments column (930) in look-up table 902)

| Key (910) | Comments (925) | Value (915) | Prefix_Value (920) | Key (910) | Comments (925) | Value (915) | Prefix_Value (920) | Comments (930) | Color (935) |
|---|---|---|---|---|---|---|---|---|---|
| 10001 | Comment 1 | 23056 | 01979879 | 10002 | Comment 2 | 0398000 | 023056 | Comment 1 | Red |
| 10002 | Comment 2 | 398000 | 023056 | 10003 | Comment 3 | 1298809 | 0398000 | Comment 2 | White |
| 10003 | Comment 3 | 1298809 | 0398000 | 10004 | Comment 4 | 439877 | 01298809 | Comment 3 | Blue |
| 10004 | Comment 4 | 439877 | 01298809 | 10005 | Comment 5 | 122333 | 0439877 | Comment 4 | Magenta |

FIG. 8C

Concept D3: Add "0" as prefix to Value (915) = Prefix_Value (950)

| Key (910) | Comments (925) | Value (915) | Prefix_Value (920) | Key (940) | Value (945) | Prefix_Value (950) | Comments (955) |
|---|---|---|---|---|---|---|---|
| 10001 | Comment 1 | 23056 | 1979879 | 10002 | 398000 | 023056 | Comment 2 |
| 10001 | Comment 1 | 23056 | 1979879 | 10011 | 7658799 | 023056 | Comment 2 |
| 10001 | Comment 1 | 23056 | 1979879 | 10012 | 7658800 | 023056 | Comment 2 |
| 10001 | Comment 1 | 23056 | 1979879 | 10009 | 7658797 | 023056 | Comment 2 |
| 10001 | Comment 1 | 23056 | 1979879 | 10010 | 7658798 | 023056 | Comment 2 |
| 10002 | Comment 2 | 398000 | 23056 | 10003 | 1298809 | 0398000 | Comment 3 |
| 10003 | Comment 3 | 1298809 | 398000 | 10013 | 7658801 | 01298809 | Comment 4 1 |
| 10003 | Comment 3 | 1298809 | 398000 | 10014 | 7658802 | 01298809 | Comment 4 2 |
| 10003 | Comment 3 | 1298809 | 398000 | 10015 | 7658803 | 01298809 | Comment 4 3 |
| 10003 | Comment 3 | 1298809 | 398000 | 10016 | 7658804 | 01298809 | Comment 4 4 |
| 10003 | Comment 3 | 1298809 | 398000 | 10017 | 7658805 | 01298809 | Comment 4 5 |
| 10003 | Comment 3 | 1298809 | 398000 | 10004 | 439877 | 01298809 | Comment 4 |
| 10004 | Comment 4 | 439877 | 1298809 | 10005 | 122333 | 0439877 | Comment 5 |

METHODS AND APPARATUS FOR HARMONIZATION OF DATA STORED IN MULTIPLE DATABASES USING CONCEPT-BASED ANALYSIS

CROSS REFERENCE TO RELATED APPLICATIONS

This application claims priority to and is a nonprovisional of U.S. Patent Application No. 62/010,631, filed Jun. 11, 2014, entitled "Methods and Apparatus for Harmonization of Data Stored in Multiple Databases Using Concept-Based Analysis", which is incorporated herein by reference in its entirety.

BACKGROUND

Embodiments described herein relate generally to information or data analysis, discovery, classification and retrieval, and more particularly to methods and apparatus for implementing data harmonization by concept-based analysis of structured data and/or unstructured data stored in multiple databases for relating previously unrelated data.

Organizations often utilize sophisticated computer systems and a multitude of databases spread across multiple physical locations to inform and automate portions of the decision-making process. Many such systems and databases organize relevant data into a structured format, making it accessible by a broad array of query, analysis, and reporting applications. Additionally, often much of the information relevant to these calculations is stored in a variety of unstructured formats—such as handwritten notes, word processor documents, e-mails, saved web pages, printed forms, photographic prints, and/or the like.

Structured data generally refers to data existing in an organized form, such as a relational database, that can be accessed and analyzed by conventional techniques (i.e. Standard Query Language, SQL). By contrast, unstructured data can refer to data in a textual format (e.g., handwritten notes, word processor documents, e-mails, saved web pages, printed forms, photographic prints, or a collection of these formats) that do not necessarily share a common organization. Unstructured information often remains hidden and un-leveraged by an organization primarily because it is hard to access the right information at the right time or to integrate, analyze, or compare multiple items of information as a result of their unstructured nature. Concept-based analysis can relate disparate unstructured information so that structuring of data can be avoided all together. It should be noted that structuring previously unstructured data from, for example, naturally occurring human friendly text is very information technology (IT) intensive and complex and typically loses original meaning and context. Concept-based analysis can provide ways for users to relate data directly so that complex technical conversions and complex programming languages such as, for example, Structured Query Language (SQL) can be avoided. The user can directly find value in unstructured data without the need for conventional tools (such as, for example, SQL, or other information query and/or analysis tools) and can analyze unstructured data for hidden trends and patterns across a corpus of unstructured data. In many instances, data (structured data and/or unstructured data) associated with an event or a task can be stored across multiple databases that are logically separate.

Hence, a need exists for a system and method for implementing data harmonization that can programmatically organize, analyze and relate structured data and/or unstructured data that are stored in multiple (separate) databases. A further need exists for a system and method for concept-based classifying, gathering, categorizing, and analyzing of structured data and/or unstructured data stored in multiple databases for tracking trends and exceptions that can be used to make determinations based on the data.

SUMMARY

In some embodiments, a data harmonization system can organize, classify, analyze and thus relate previously unrelated data stored in multiple databases and/or associated with different organizations. In such embodiments, the data harmonization system can relate such previously unrelated data sets to, for example, track trends, exceptions, inconsistencies, location, etc. such that determinations can be made based on such different and/or previously unrelated data sets. In such embodiments, the data harmonization system can be used to harmonize both structured data and/or unstructured data based on concept-based analysis.

BRIEF DESCRIPTION OF THE DRAWINGS

FIG. 4A is an example of data stored in the three databases shown in FIG. 3, according to an embodiment.

FIG. 7A is an example of data stored in the three databases of FIG. 6, according to an embodiment.

FIG. 7B is an example of implementing data harmonization of data stored in the three databases shown in FIG. 6, according to an embodiment.

FIG. 8B is an example of implementing data harmonization of data stored in database 710 to itself, according to an embodiment.

FIG. 8C is an example of implementing a data harmonization of data stored in database 720 to the data stored in table 904, according to an embodiment.

FIG. 8D is an example of implementing data harmonization of data stored in database 710 to the data stored in database 730, according to an embodiment.

DETAILED DESCRIPTION

Figure 1:
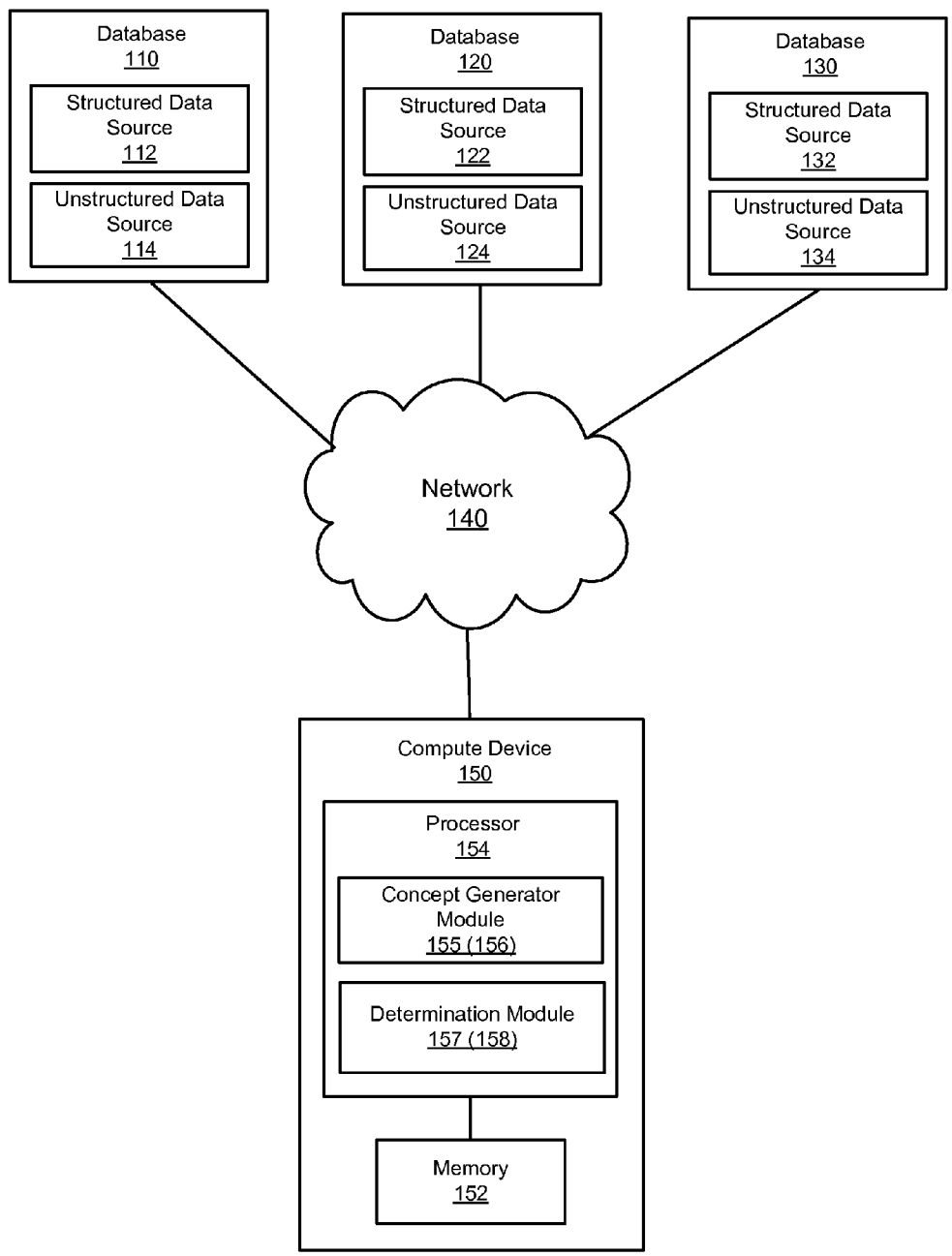
FIG. 1 is a schematic diagram that illustrates a data harmonization system, according to an embodiment.

In some embodiments, a data harmonization system can organize, classify, analyze and thus relate previously unrelated data stored in multiple databases and/or associated with different organizations. In such embodiments, the data harmonization system can relate such previously unrelated data sets to, for example, track trends, exceptions, inconsistencies, location, etc. such that determinations can be made based on such different and/or previously unrelated data sets. In such embodiments, the data harmonization system can be used to harmonize both structured data and/or unstructured data based on concept-based analysis.

As used herein, "data harmonization" refers to a method for relating previously unrelated sets of data that can be stored in multiple (and separate) databases that are associated with different organizations to, for example, track trends, exceptions, inconsistencies, locations, etc. such that determinations can be made based on such different and previously unrelated data sets.

As used herein, "concept" refers to a representation of any real world observation and/or a collection of one or more words or phrases that convey an idea or meaning. A concept can also be and/or include one or more business needs, ideas, behaviors, collections of multi-faceted entities, or any combination thereof. In some embodiments, a concept can be defined based at least in part on a combination of machine-learning techniques and/or user input. More information regarding concepts, concept definitions and concept discovery is set forth in U.S. Pat. Nos. 6,970,881 and 7,194,483, entitled "Concept-based Method and System for Dynamically Analyzing Unstructured Information" and "Method, System, and Computer Program Product for Concept-based Multi-dimensional Analysis of Unstructured Information", respectively, both of which are hereby incorporated by reference in their entireties.

A concept can also include structured data (such as codes and numbers) and/or unstructured data (such as human-friendly text). In some embodiments, a machine or user can define one or more concepts based at least in part on other concepts in a hierarchical manner, and/or as part of a regular expression or a combination of both. Further information regarding hierarchical concepts and concepts defined based at least in part on one or more regular expressions is set forth in co-pending U.S. Pat. App. Pub. No. 2010/0262620 filed on Apr. 14, 2009, and entitled "Concept-Based Analysis of Structured and Unstructured Data Using Concept Inheritance", which is hereby incorporated by reference in its entirety. In some embodiments, a concept can optionally include structured data and/or unstructured data at various levels of granularity, thereby providing the ability to seamlessly blend data as dictated by, for example, a business rule.

As used herein, "concept hierarchy" can be based on, for example, any combination of any number of: a concept present in the content of one or more structured and/or unstructured data, a coded data value in a particular range, or one or more other concepts. A concept can be, for example, one or more words or phrases that convey an idea. In some embodiments, the concept hierarchy can include a concept based at least in part on a regular expression that evaluates the presence or absence of a particular sub-concept in the content of a structured data and/or unstructured data.

FIG. 1 is a schematic diagram that illustrates a data harmonization system, according to an embodiment. Specifically, FIG. 1 illustrates a data harmonization system 100 that includes a first database 110, a second database 120, a third database 130, a network 140, and a compute device 150. Database 110, database 120 and database 130 are logically separate databases that can be physically located either in separate non-transitory computer-readable media or the same non-transitory computer-readable medium. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks, Read-Only Memory (ROM) and Random-Access Memory (RAM) devices. Database 110 includes a structured data source 112 and an unstructured data source 114, database 120 includes a structured data source 122 and an unstructured data source 124, and database 130 includes a structured data source 132 and an unstructured data source 134.

The structured data sources 112, 122 and 132 can include data present in organized columns, tables, spreadsheets, or other data structures, such as relational databases (e.g., Oracle, IBM DB2, Microsoft SQL Server, MySQL and/or PostgreSQL relational databases, etc.), one or more comma-separated values (CSV) files, one or more other pattern-delimited files, or other structured data format hierarchy. The unstructured data sources 114, 124 and 134 can be, for example, one or more of: a handwritten document, a typed document, an electronic word-processor document, a printed or electronic spreadsheet document, a printed form or chart, or other electronic document that contains text such as an e-mail, Adobe PDF document, Microsoft Office document, and/or the like. In some instances, the structured data sources 112, 122 and 132 can include, for example, one or more unstructured data elements, such as a string of text stored in as a relational database column of type string or variable character field (varchar). The structured data sources 112, 122 and 132 and the unstructured data sources 114, 124 and 134 can include data pertaining to an organization (or an entity) such as, for example, a government agency, a regulatory agency, a private enterprise, a third party auditing agency, a private individual, a monetary transaction, a contractual agreement, an insurance claim, and/or the like.

The network 140 can be any type of network (e.g., a local area network (LAN), a wide area network (WAN), a virtual network, and a telecommunications network) implemented as a wired network and/or wireless network. As described in further detail herein, in some configurations, for example, the databases 110, 120 and 130 can be operably coupled to the compute device 150 via an intranet, an Internet Service Provider (ISP) and the Internet, a cellular network (e.g., network 140), and/or the like.

In some instances, the compute device 150 can be, for example, a server or a host machine such as for example, a web server, an application server, a proxy server, a telnet server, and/or a file transfer protocol (FTP) server. In other instances, compute device 150 can also be a personal computing device such as a desktop computer, a laptop computer, a personal digital assistant (PDA), a standard mobile telephone, a tablet personal computer (PC), and/or so forth. The compute device 150 includes a memory 152 and a processor 154. The memory 152 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some configurations, the memory 152 stores instructions to cause the processor 154 to execute modules, processes and/or functions associated with the compute device 150 and/or such a data harmonization system 100.

The processor 154 can be a general purpose processor, a Field Programmable Gate Array (FPGA), an Application Specific Integrated Circuit (ASIC), a Digital Signal Processor (DSP), and/or the like. The processor 154 can be configured to run and/or execute processes and/or other modules, and/or functions associated with the data harmonization system 100. The processor 154 includes a concept generator module 156 and a determination module 158. The concept generator module 156 can be hardware module or a software module (stored in the memory and/or executed in the processor of the compute device) that can receive data that includes a set of structured data and/or unstructured data from the databases 110, 120 and/or 130 via the network 140. In other instances, the compute device 150 can be included in the same device that includes one or more of the databases 110, 120 and/or 130. In such instances, the concept generator module 156 can also access a set of structured data and/or unstructured data from the databases 110, 120 and/or 130 locally (e.g., via an internal bus).

Upon receipt of the set of structured data and/or unstructured data (either via a local bus and/or via the network 140), the concept generator module 156 can be configured to generate a set of concepts and/or a concept hierarchy, by, for example executing a concept extraction technique such as that detailed in U.S. Pat. No. 7,194,483 to Mohan et al., and entitled "Method, System, and Computer Program Product for Concept-Based Multi-dimensional Analysis of Unstructured Information", and U.S. Pat. App. Pub. No. 2010/0262620 filed on Apr. 14, 2009, and entitled "Concept-Based Analysis of Structured and Unstructured Data Using Concept Inheritance", the disclosures of which are incorporated herein by reference in their entirety.

In some embodiments, the concept generator module 156 can provide functionality that allows a user to add a concept and/or delete a concept from a set of concepts and/or a concept hierarchy. Additionally, in some instances, the concept generator module 156 can also provide functionality that can allow a user to edit and/or modify an existing concept or relationship between one or more concepts. More specifically, in such instances, the concept generator module 156 can display a visual representation of the resulting set of concepts and/or the concept hierarchy that has been generated and/or defined and can include functionality that can allow a user to send input signals to the concept generator module 156 that indicate a desired change to a concept in a set of concepts and/or a concept in a nestled concept and/or a concept hierarchy as shown by an example in FIG. 2.

Figure 2:
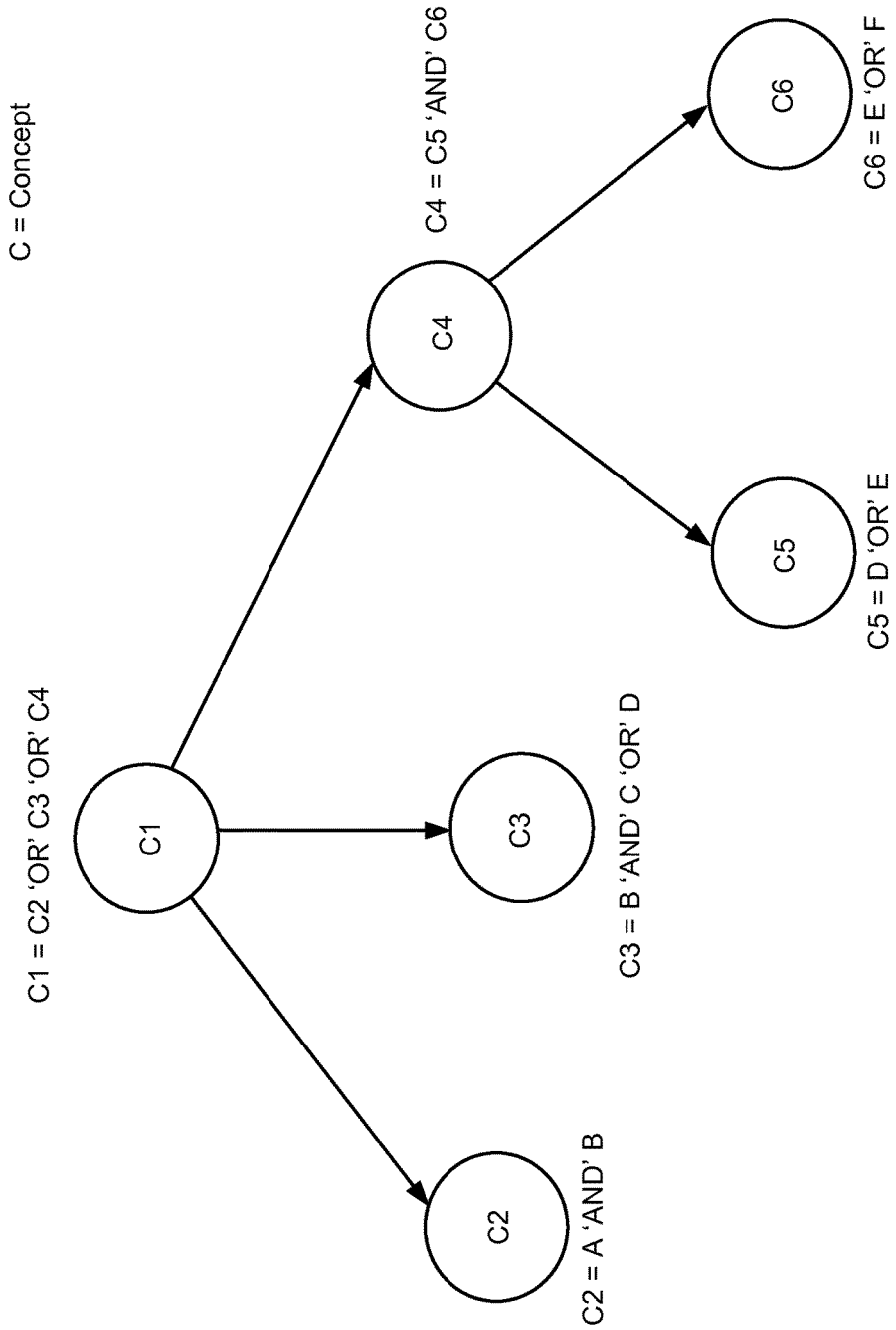
FIG. 2 is a schematic diagram that illustrates an example of a concept hierarchy, according to an embodiment.

FIG. 2 is a schematic diagram that illustrates an example of a concept hierarchy, according to an embodiment. The data harmonization system can generate and/or define a concept hierarchy (shown as concept C1 in FIG. 2) that is comprised of a logical combination of three other concepts (shown as concepts C2, C2 and C4 in FIG. 2). Hence in FIG. 2, concept C1 can be defined as C1=C2 'OR' C3 'OR' C4. Note that the use of the Boolean logic "OR" is presented as a generic example only and not a limitation. In other instances, other Boolean and/or logical operators such as, for example, "AND", "OR", "NAND", "NOR", "XOR", "XNOR" and "NOT" can be used to relate two separate concepts and define a new concept. Concept C2 can be defined as A 'AND' B (C2=A' AND 'B'), where 'A' and 'B' can refer to, for example, any real world observation and/or a collection of one or more words, phrases, signs, numbers or any other terminology that convey an idea or meaning in the structured data and/or the unstructured data stored in the databases 110-130 in FIG. 1. Concept C3 can be defined as B 'AND C 'OR' D (C2=B 'AND' C 'OR' D), where 'C' and 'D' can also refer to, for example, any real world observation and/or a collection of one or more words, phrases, signs, numbers or any other terminology that convey an idea or meaning in the structured data and/or the unstructured data stored in the databases 110-130 in FIG. 1. Concept C4 is itself a concept hierarchy and can be defined as concept C5 'AND' concept C6 (C4=C5 'AND' C6), where concept C5 can be defined as D 'OR' E (C5=D 'OR' E) and concept C6 can be defined as E 'OR' F (C6=E 'OR' F). In such instances 'E' and 'F' can also refer to, for example, any real world observation and/or a collection of one or more words, phrases, signs, numbers or any other terminology that convey an idea or meaning in the structured data and/or the unstructured data stored in the databases 110-130 in FIG. 1.

Referring to FIGS. 1 and 2, the concept generator module 156 can provide functionality that allows a user to add and/or delete and/or modify (or edit) a concept from a set of concepts and/or a concept hierarchy. In one example, the concept generator module 156 can provide functionality that can allow a user to add a new concept (defined as concept C7) to the concept hierarchy C1 and thus re-define C1 as C1=C2 'OR' C3 'OR' C4 'AND' C7. In another example, the concept generator module 156 can provide functionality that can allow a user to modify (or edit) the concept hierarchy C and thus re-define C1 as C1=C2 'AND' C3 'AND' C4. In yet another example, the concept generator module 156 can provide functionality that can allow a user to delete concept C5, thus re-defining C4 as C4=C6=E 'OR' F.

The concept generator module 156 can receive these signals and accordingly update a concept and/or a concept hierarchy according to the desired changes. In some instances, the concept generator module 156 can receive a file that defines one or more concepts, with the location of the file being specified by a user. The concept generator module 156 can include the one or more concepts as part of the concept hierarchy. In some instances, the above-described concept hierarchy definition methods can be performed iteratively until the concept generator module 156 receives a signal from a user indicating that the concept hierarchy meets an acceptable criterion. In some instances, the concept generator module 156 can be configured to detect concepts within the data set being analyzed that are positively-correlated within the data. In some instances, after such detection processes, the concept generator module 156 can recursively combine such concepts into higher-level concepts until all highest-level concepts in the concept hierarchy occur independently of one another.

Because concepts can occur in text (typically unstructured data), the concept generator module 156 can be configured to employ co-occurrence, proximity and linguistic techniques to discover links between concepts present in unstructured data. More specifically, in some instances, the concept generator module 156 can discover and/or define a link between two of more concepts based on: a) a co-occurrence of the two or more concepts within the same document; b) a co-occurrence of the two or more concepts within a user-defined proximity within a document or documents; and c) recognition of a subject-predicate, subject-object or predicate-object relationship present within a natural language portion. In this manner, the concept generator module 156 can analyze documents or records based on the concepts present therein, and thus provide a dynamic alternative to traditional link analysis techniques.

The concept generator module 156 can generate a decision rule or a set of decision rules based on the received data and/or concepts generated. A decision rule can be comprised of a concept or a set of concepts. For example, in some instances, a decision rule can involve applying three concepts to analyze structured data and/or unstructured data stored in multiple databases that are associated with an automobile insurance company, a police department and an auditing agency, respectively, to reveal fraudulent automobile insurance claims in a specific geographic area. In such instances, the decision rule can include, for example, applying a first concept (concept D1) that analyzes the audit reports generated by the auditing agency regarding all the insurance claims submitted to the automobile insurance company in the given geographic area, and applying a second concept (concept D2) that analyzes if one or more individuals involved in an incident associated with an insurance claim is on a watch list of suspect individuals (found in the database of the automobile insurance company and/or the database of the police department), and applying a third concept (concept D3) that analyzes if the insurance claimant has provided false information (found in the database of the police department and/or the database of the automobile insurance company). In such instances, the decision rule (Potentially_Fraudulent_Claim) can be expressed by a single logical expression, which constitutes a fraudulent claim: Potentially_Fraudulent_Claim=(D1 'AND' D2 'OR' D3) (where each concept in the expression represents the presence of that concept in the examined structured data and/or unstructured data).

In some instances, the concept generator module 156 can receive a set of concepts by reading the concepts from a removable storage medium such as an optical disc, an external hard disk drive, or a flash memory module. In some instances, the concept generator module 156 can provide to a user, functionality for composing a decision rule based on the generated concepts and/or a concept hierarchy. The concept generator module 156 can, for example, provide a graphical user interface (not shown in FIG. 1) that includes a visual representation of the concepts and/or concept relationships that comprise the concept hierarchy. Such an interface can, for example, allow a user to manipulate the visual representation and enter logic to define a decision rule. The concept generator module 156 can output a decision rule and/or a set of decision rules, which, along with a data set from the structured data sources 112, 122 and 132 and unstructured data sources 114, 124 and 134 from the three databases 110-130 can be used by a determination module 158 to generate a determination based on the data set 112, 114, 122, 124, 132 and 134. The determination module 158 can generate a determination using a determination technique such as that detailed in the patent and patent applications discussed above.

The determination module 158 can be hardware module or a software module (stored in the memory and/or executed in the processor of the compute device). In some instances, the determination module 158 can receive the contents of the decision rule from the concept generator module 156. In other instances, the determination module 158 can receive the contents of the decision rule via, for example, a removable storage medium such as an optical disc, an external hard disk drive, or a flash memory module. The determination module 158 can execute the decision rule or the set of decision rules using the data set 112, 122, 132, 114, 124 and 134 to produce a determination. In some instances, the determination module 158 can be configured to output text and/or graphics associated with the determination to a display device (not shown in FIG. 1) such as, for example, a computer monitor, a television, a liquid crystal display (LCD) screen, a light emitting diode (LED) screen, a video projector, and/or the like.

More generically, a data harmonization system can be involved in harmonizing two sets of data stored in two separate source files such as, for example, a document-concepts matrix, structured data spreadsheet, tables, views and comma separated values file, etc. In such instances, the data harmonization system first selects the source file from each of the data sets and compares the length of the source file. The smaller of the two source files is then selected and read line by line by the data harmonization system. Additionally, the value contained in the first source that is to be compared is extracted by the data harmonization system. For example, the value contained in the first source file can be the date of a specific insurance claim, or the geographical location of occurrence of the incident leading to the insurance claim. In some instances, the extracted value from the first source file can be hashed by the data harmonization system, and used as the key in a key value pair containing the key and the original row of data in the first source file as a string list. This process is continued until the entire first source file is read in by the data harmonization system and a key value pair dictionary is created for the whole file by the data harmonization system. The second source file (i.e., the larger of the two source files) is subsequently read (line by line) by the data harmonization system and the value contained in the second source file that is to be compared is extracted by the data harmonization system. The extracted value from the second source file is then passed through the same hash function as before, and the resulting hash value is tested to confirm if it is contained in the key value pair dictionary that was created by the data harmonization system from the first source file. Said in another way, the hashed value corresponding to the extracted value from the second source file is compared to the contents of the key value pair dictionary that was created by the data harmonization system from the first source file. If there is a match, then the actual value that corresponds to the (matched) hash value is read by the data harmonization system, concatenated with the row from the second file being compared, and written to, for example, a result csv file. In instances where the data harmonization system is harmonizing data stored in more than two separate source files, the process described above continues until all files have been compared in such a manner by the data harmonization system. If there are multiple harmonizations to be completed, the result file from the previous harmonization attempt (e.g., the csv file described above) is used as the first data source, and compared with the next selected data source in the same way as described above. Once all harmonizations have been completed, the new result csv file is returned to the end user to be opened, for example, in a spreadsheet for review by the user. The data harmonization system is described in greater detail with specific examples in relation to FIGS. 3-8.

Figure 3:
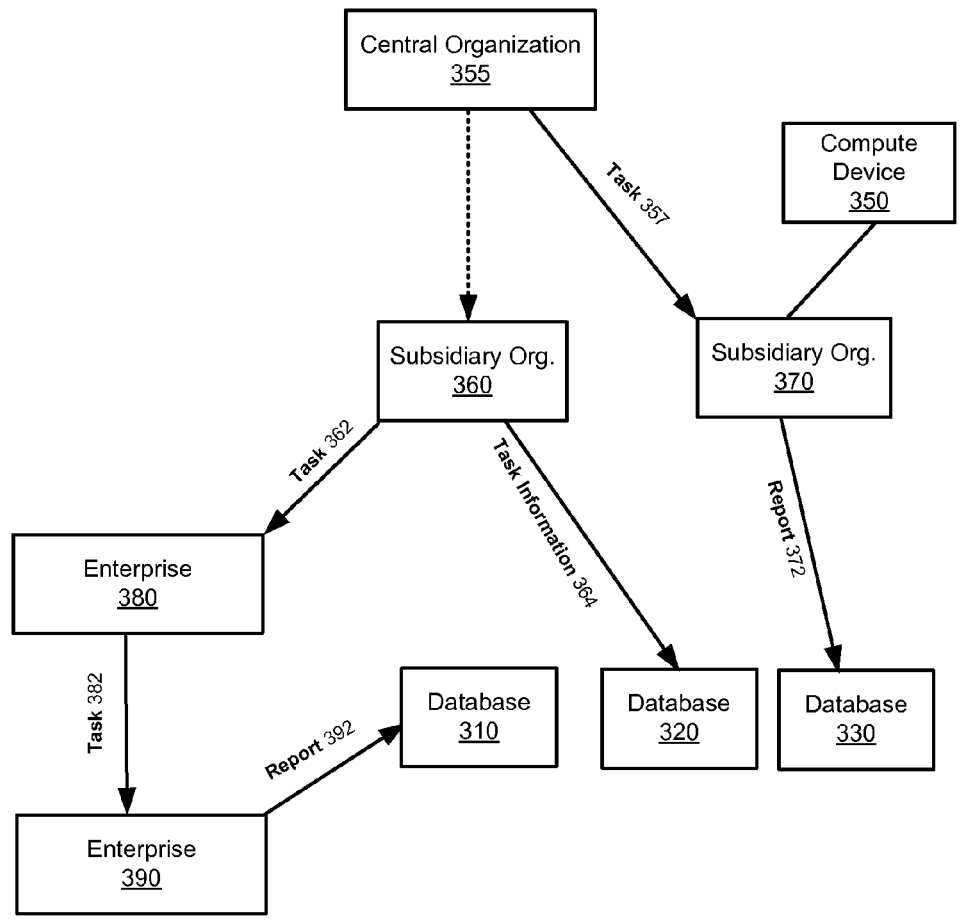
FIG. 3 is a schematic diagram that illustrates an example of an implementation of a data harmonization system, according to an embodiment.

FIG. 3 is a schematic diagram that illustrates an example of an implementation of a data harmonization system, according to an embodiment. FIG. 3 includes a first database 310, a second database 320 and a third database 330. FIG. 3 further includes a central organization 355 that can be, for example, the United States Federal Government. The central organization 355 can include subsidiary organizations 360 and 370. The subsidiary organization 360 can be, for example, a US government agency such as the Environment Protection Agency (EPA), the US Department of Health and Human Services (HHS), the US Department of Transportation, the Department of Defense (DOD), the Department of Energy (DOE), the Federal Bureau of Investigation (FBI), the Central Intelligence Agency (CIA), and/or the like. The subsidiary organization 370 can be, for example, the US Department of Justice Office of the Inspector General (OIG), and/or the like. The subsidiary organization 360 can assign a task 362 to an enterprise 380. The enterprise 380 can be, for example, a corporation, a private company (e.g., an insurance company), a business franchise, a non-profit organization, a bank, an individual, a city police department, a state Sheriff's office, and/or the like. It is to be noted that organizations 360 and 370 has been shown to be subsidiary organizations of the central organization 355 as an example only and not a limitation. In other configurations, organizations 360 and 370 can be organizations that are independent of the central organization 355.

The task 362 assigned by the subsidiary organization 360 to the enterprise 380 can be, for example, a contract for environmental cleanup, a contract for building a federal building in a city, a contract for construction of interstate highways, a contract for building a bridge, a contract for maintenance of a national park, and/or the like. Enterprise 380 can assign a specific task 382 to a second enterprise 390. The enterprise 390 can be, for example, a professional services firm, a law firm, a technology consulting firm, a management consulting firm, an auditing agency, and/or the like. The task 382 assigned by enterprise 380 to enterprise 390 can be, for example, creating an audit report of the federal contracts received by enterprise 380, generate a record of different crimes committed in a city block in a specific month, generate a criminal record of an individual, and/or the like.

Enterprise 390 can send a report 392 to a database 310. The report 392 can be, for example, an audit report of the federal contracts received by enterprise 380, a criminal record associated with an individual, a report on an insurance claim associated with a specific automobile, and/or the like. The report 392 can include structured data and/or unstructured data. The database 310 can be, for example, a database or a look-up table stored in a random access memory (RAM), a memory buffer, a hard drive, an erasable programmable read-only memory (EPROM), an electrically erasable read-only memory (EEPROM), a read-only memory (ROM), and/or so forth. The subsidiary organization 360 can assign a task 364 of storing general data or information associated with the subsidiary organization 360 to a database 320. The data or information associated with the task 364 can include structured data and/or unstructured data sent to database 320 via, for example, a data stream. The database 320 can be, for example, a database or a look-up table stored in a random access memory (RAM), a memory buffer, a hard drive, an erasable programmable read-only memory (EPROM), an electrically erasable read-only memory (EEPROM), a read-only memory (ROM), and/or so forth. It should be noted that the compute device 350 that implements the data harmonization system has been shown to be associated with the subsidiary organization 370 in FIG. 3 as an example only and not a limitation. In other instances, the compute device 350 that implements the data harmonization system can be associated with the central organization 355 and/or the subsidiary organization 360 and/or the enterprise 380 and/or the enterprise 390 and/or the databases 310-330 (either one or multiple databases) and/or an organization or a database not shown in FIG. 3.

The central organization 355 can assign a task 357 to the subsidiary organization 370. The task 357 can be, for example, creating an audit report of all contracts awarded by the central organization 355 to private enterprises, creating an annual report on progress of development works associated with the contracts awarded by the central organization 355, creating an annual report on failures of projects associated with the contracts awarded by the central organization 355, creating a report on the budget proposed by the central organization 355 for a fiscal year, and/or the like. The subsidiary organization 370 can send data or information associated with the task 357 to a database 330 via, for example, a data stream. The data or information associated with the task 357 can include structured data and/or unstructured data sent to database 330 via, for example, a data stream. The database 330 can be, for example, a database or a look-up table stored in a random access memory (RAM), a memory buffer, a hard drive, an erasable programmable read-only memory (EPROM), an electrically erasable read-only memory (EEPROM), a read-only memory (ROM), and/or so forth. Note that the databases 310-330 are logically separate databases. In some configurations, the databases 310-330 can be included within separate hardware devices, and in other configurations, the databases 310-330 can be included within the same hardware device.

In some instances, the data harmonization system can be implemented in, for example, a compute device 350 associated with subsidiary organization 370. The data harmonization system can access and analyze both structured data and/or unstructured data included within the three databases 310-330 associated with different organizations/enterprises, for example, to make a specific determination. After obtaining the different sets of data from the databases 310-330, the data harmonization system can be configured to generate a set of concepts and/or a concept hierarchy by, for example executing a concept extraction technique as described above. Additionally, the data harmonization system included in the compute device 350 can also modify or edit (e.g., add to and/or delete from) existing concepts generated by the data harmonization system and/or obtained from an external source (e.g., a USB key, a portable hard drive, etc.). The data harmonization system can then use the concepts to classify, gather, categorize, analyze and thus relate the set of structured data and/or unstructured data across the three databases 310-330 to, for example, track trends and exceptions that can be used to make accurate determinations based on the data (data harmonization). Such determinations can include, for example, determination of fraud in a worker's compensation insurance claim associated with an enterprise; determination of fraud in automobile insurance claims, determination of fraudulent audit reports generated by an enterprise, discovering links between persons and/or organizations that fit a combination of predefined characteristics and/or behaviors, and/or the like.

FIG. 4A is an example of data stored in the three databases shown in FIG. 3, according to an embodiment. As described above, the data stored in each database can include both structured data in an organized form such, for example, in a relational database, and unstructured data. Additionally, as described above, the data harmonization system can categorize and analyze the unstructured data to generate a new set of structured information based on the analysis such that data can be related by the end-user without the need for implementing conventional programming techniques (e.g., SQL) on the structured information to access the unstructured data.

The data stored in database 310 (shown in FIG. 3) can be represented, for example, by the look-up table 401. The look-up table 401 includes data stored under a report ID 410, and three characteristics associated with the data 415, 420 and 425. Such data characteristics can include, for example, the date a particular report (or file) was created, the name of the individual that created the report (or file), the address of the organization or enterprise where the report (or file) was created, the branch number of the organization or enterprise where the report (or file) was created, an indication of fraud detected with the report or file (e.g., if the file is an audit report, an insurance claim, etc.), a database pointer for the database where the report (or file) is stored, and/or the like.

The data stored in database 320 (shown in FIG. 3) can be represented by, for example, the look-up table 402. The look-up table 402 includes data stored under database pointer 430, a filename 435, and three characteristics associated with the data 440, 445 and 450. Such data characteristics can include, for example, the date a particular report (or file) was created, the name of the individual that created the report (or file), the address of the organization or enterprise where the report (or file) was created, the branch number of the organization or enterprise where the report (or file) was created, an indication of fraud detected with the report or file (e.g., if the file is an audit report, and insurance claim, etc.), a name of the report (or file), an identification code associated with the report or file, and/or the like.

The data stored in database 330 (shown in FIG. 3) can be represented by, for example, the look-up table 403. The look-up table 403 includes data stored under a database pointer 455, and three characteristics associated with the data 460, 465 and 470. Such data characteristics can include, for example, the date a particular report (or file) was created, the name of the individual that created the report (or file), the address of the organization or enterprise where the report (or file) was created, the branch number of the organization or enterprise where the report (or file) was created, an indication of fraud detected with the report or file (e.g., if the file is an audit report, an insurance claim, etc.), a database pointer for the database where the report (or file) is stored, an identification code associated with the report (or file), and/or the like.

Figure 4B:
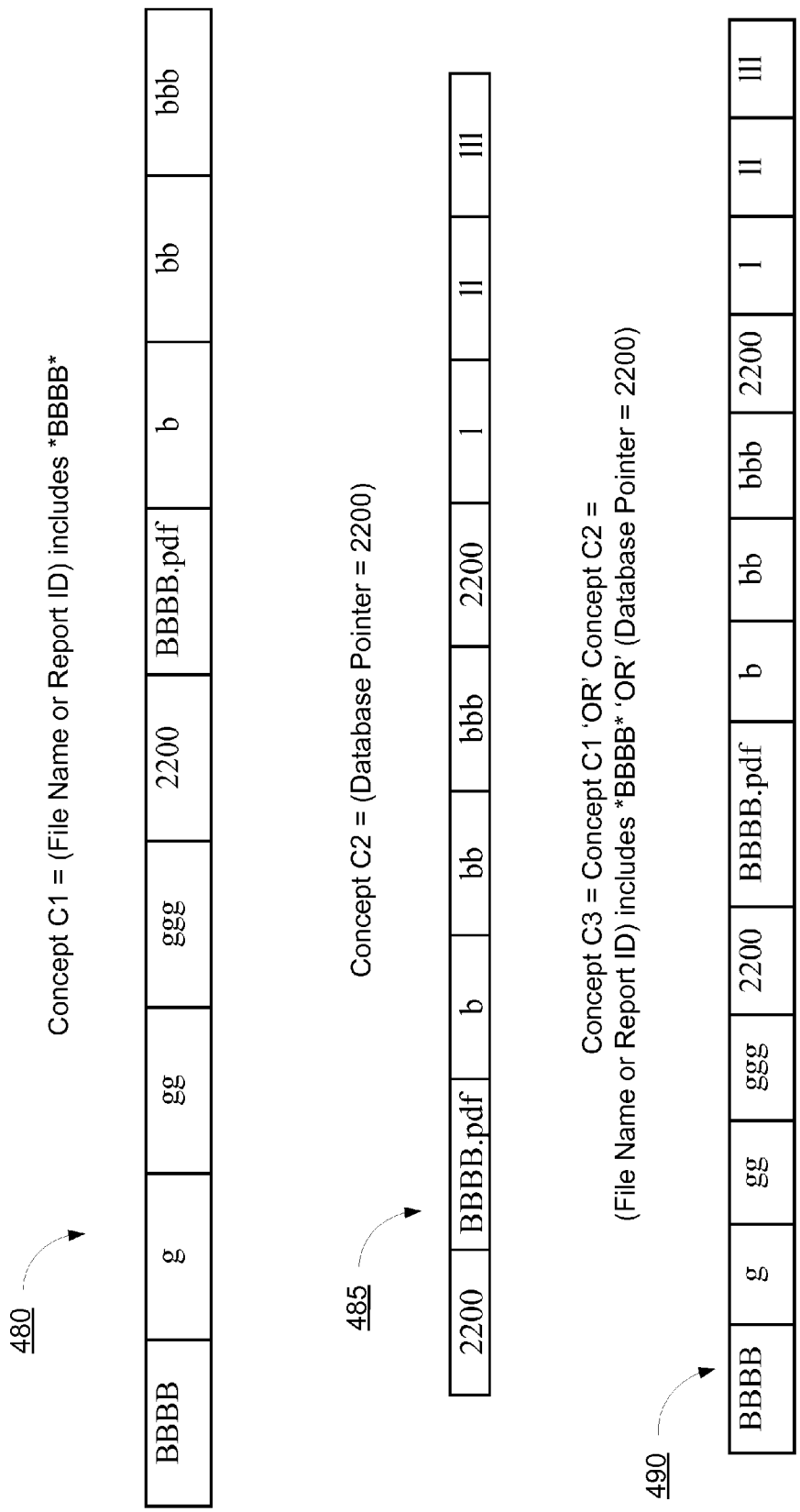
FIG. 4B is an example of an implementation of data harmonization of data stored in the three databases shown in FIG. 3, according to an embodiment.

FIG. 4B is an example of an implementation of data harmonization of data stored in the three databases shown in FIG. 3, according to an embodiment. The compute device 350 shown in FIG. 3 can be the apparatus or device that implements data harmonization of the data stored in the different databases as described above.

The data harmonization system (implemented in the compute device 350) can generate and/or define a first concept (shown as concept C1 in FIG. 4B) to locate any file and/or report across the three databases 310, 320 and 330 (shown in FIG. 3) that includes the letters "BBBB" (case specific) in the filename or the report ID. The data harmonization system can analyze all the data stored the three databases and retrieve the results of the analysis in a table 480. Table 480 includes the entries of the look-up tables 401, 402 and 403 shown in FIG. 4A that are associated with a filename or a report ID with the letters "BBBB"(in uppercase). The letters "BBBB" has been used as a generic example and not a limitation, and can be representative of any number of search or analysis terms such as, for example, a code associated with the organization or enterprise that generated a particular entry (a file or a report) in the look-up tables 401, 402 and 403. Subsequently, the data harmonization system can generate and/or define a second concept (shown as concept C2 in FIG. 4B) to locate any file or report across the three databases 310, 320 and 330 (shown in FIG. 3) that includes the numbers "2200" in their respective database pointers. The data harmonization system can analyze all the data stored the three databases and retrieve the results of the analysis in a table 485. Table 485 includes the entries of the look-up tables 401, 402 and 403 shown in FIG. 4A that are associated with the numbers "2200" in their respective data pointers. The numbers "2200" has been used as an example and can be representative of any number of search or analysis terms such as, for example, an identifier associated with a database that stores audit reports for all federal contracts for repairing interstate highways in the greater Washington D.C. area. Subsequently, the data harmonization system can generate and/or define a third concept (shown as concept C3 in FIG. 4B) to locate any file or report across the three databases 310, 320 and 330 (shown in FIG. 3) that includes the letters "BBBB"(case specific) in the filename or the report ID 'OR' includes the numbers "2200" in their respective database pointers (hence, C3=C1 'OR' C2). Note that the use of the Boolean logic "OR" is presented as a generic example only and not a limitation. In other instances, other Boolean and /or logical operators such as, for example, "AND", "OR", "NAND", "NOR", "XOR", "XNOR" and "NOT" can be used to relate two separate concepts and define a new concept. The data harmonization system can analyze all the data stored the three databases and retrieve the results of the analysis in a table 490. Table 490 includes the entries of the look-up tables 401, 402 and 403 shown in FIG. 4A that are associated with a filename or a report ID including the letters "BBBB"(in uppercase) OR' includes the numbers "2200" in their respective database pointers.

Table 490 is the result of the data harmonization process that is implemented by the data harmonization system and can relate previously unrelated data that are stored in multiple databases 310, 320 and 330. For example, table 490 reveals that characteristic 415 ('g') in look-up 401 stored in database 310 (in FIG. 3) can be related to and/or associated with and/or compared to characteristic 460 ('l') in look-up table 403 stored in database 330 (in FIG. 3) to, for example, make a first determination. Additionally, characteristic 420 ("gg") in look-up table 401 stored in database 310 (in FIG. 3) can also be related to and/or associated with and/or compared to characteristic 465 ('ll') in look-up table 403 stored in database 330 (in FIG. 3) to, for example, make a second determination. Similarly, characteristic 425 ("ggg") in look-up table 401 stored in database 310 (in FIG. 3) can also be related to and/or associated with and/or compared to characteristic 470 ('lll') in look-up table 403 stored in database 330 (in FIG. 3) to, for example, make a second determination. Comparison of such previously unrelated data by implementing the said data harmonization system can allow a user (e.g., a government agency), for example, to make a determination that is associated with an inquiry. Examples of such determinations can include determining the identity of a (corrupt and/or incompetent) employee of an auditing agency that is responsible for generating fraudulent audit reports, determining the identity of an individual that makes a series of fraudulent automobile insurance claims, determining the identity of a criminal associated with serial shoplifting in a specific neighborhood in a city, determining the risk level associated with allowing entry to an alien in the US, and/or the like. Note that in some instances, subsequent concepts (not shown in FIG. 3B) can be defined and/or generated by the data harmonization system and applied to, for example, table 430 to narrow the information associated with an inquiry in order to increase the accuracy of the determination.

In some instances, the data harmonization system can apply a concept to the data stored in the databases 310, 320 and 330 that can search the data for any real world observation and/or a collection of one or more words, phrases, signs, numbers or any other terminology that convey an idea or meaning that are contained within the concept. In such instances, the data harmonization system can assign a score to each occurrence of the words, phrases, signs, numbers or any other terminology in a data element in the data. Additionally, in some instances, the different words, phrases, signs, numbers or terminologies contained within the concept can have different importance or weights. Hence, in such instances, the data harmonization system can also assign a weighted score to each occurrence of the different words, phrases, signs, numbers or other terminologies in a data element of the data.

For example, in some instances, the data harmonization system can define a concept and apply the concept to the data stored in the databases 310, 320 and 330 that can search the data for files (or reports) being created in a specific area, where the area can be defined by a set of zip codes. In such instances, the data harmonization system can analyze the structured data and/or unstructured data stored in databases 310, 320 and 330 and search the data for the number of times a first set of zip codes within the specified area appears in the data, and also search the data for the number of times a second set of zip codes appears in the data that are within a pre-determined radial distance of the specified area (e.g., within 50 miles of the specified area). In such instances, the data harmonization system can score each occurrence the zip code in the data that is inside the specified area with a first weighed value, and each occurrence of the zip code in the data that is within the pre-determined radial distance from the specified area with a second weighed value (lower than the first weighed value). Hence, in such instances, the data harmonization system can assign a score to each data element in the data set that is based on both the number of hits and the quality of the hits by virtue of the assigned weight value.

Figure 5:
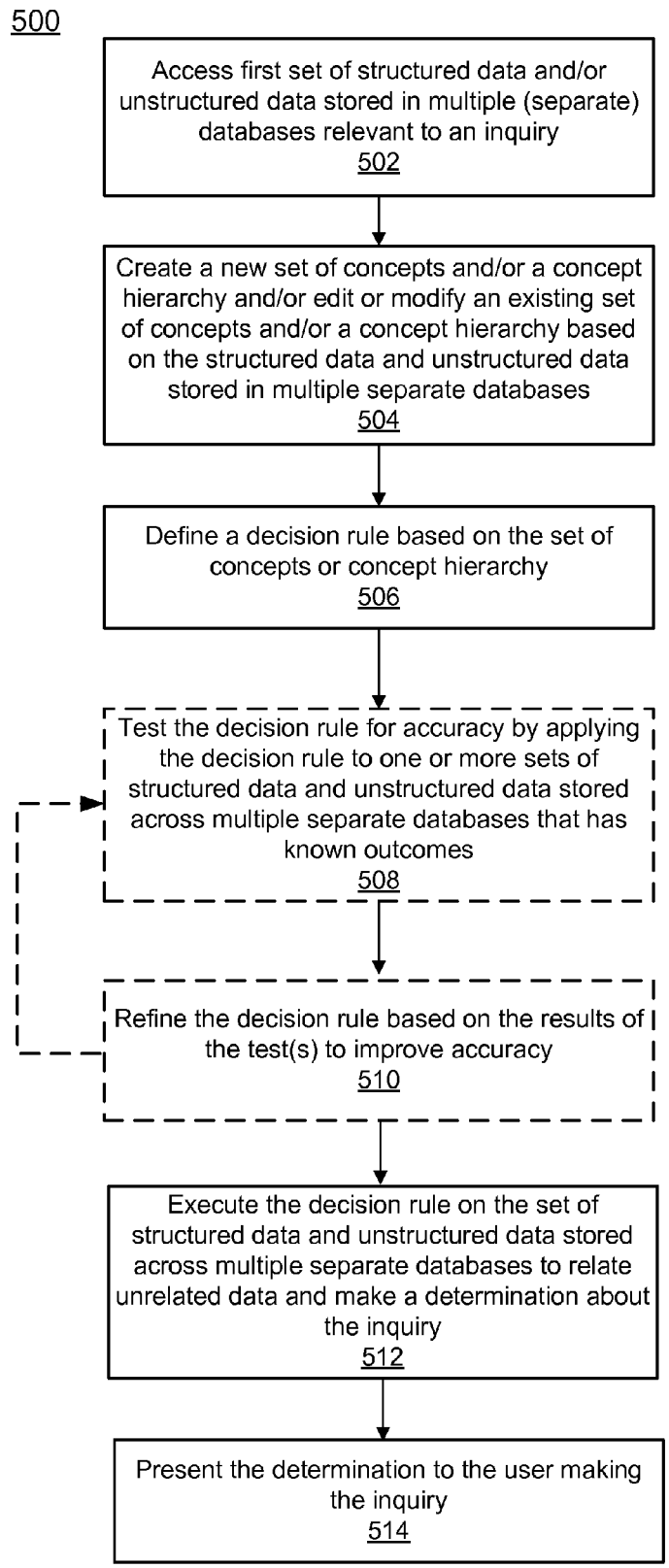
FIG. 5 is a flowchart that illustrates a method for relating previously unrelated data using a data harmonization system, according to an embodiment.

FIG. 5 is a flowchart that illustrates a method for relating previously unrelated data using a data harmonization system, according to an embodiment. As shown in the method 500 in FIG. 5, a first set of previously unrelated structured data and/or unstructured data stored across multiple (separate) databases that are relevant to an inquiry is accessed, at 502. As described above, the set of structured data and/or unstructured data can be stored across multiple databases that are located, for example, either in separate non-transitory computer-readable media or on the same non-transitory computer-readable medium (on a computer system such as a personal computer or network server). As described above, the first set of structured data and/or unstructured data can be accessed by, for example, a compute device that can implement a data harmonization system. As described above, the structured data can include data present in organized columns, tables, spreadsheets, or other data structures, such as relational databases (e.g., Oracle, IBM DB2, Microsoft SQL Server, MySQL or PostgreSQL relational databases), one or more comma-separated values (CSV) files, one or more other pattern-delimited files, or other structured data format hierarchy. As described above, the unstructured data can be, for example, one or more of: a handwritten document, a typed document, an electronic word-processor document, a printed or electronic spreadsheet document, a printed form or chart, or other electronic document that contains text such as an e-mail, Adobe PDF document, Microsoft Office document, and/or the like. As described above, the structured data and/or the unstructured data can include data associated with an organization such as, for example, a government agency, a regulatory agency, a private enterprise, a third party auditing agency, a private individual, a monetary transaction, a contractual agreement, an insurance claim, and/or the like.

At 504, a new set of concepts and/or a concept hierarchy is created and/or an existing set of concepts and/or a concept hierarchy is edited or modified (e.g., added to and/or deleted from) based on the structured data and/or the unstructured data stored in multiple databases. As described above, the set of concepts and/or a concept hierarchy can be created or defined at for example, the concept generator module of a compute device that implements the data harmonization system. As described above, a "concept" can refer to a representation of any real world observation and/or a collection of one or more words or phrases that convey an idea or meaning. Additionally, a concept can also be and/or include one or more business needs, ideas, behaviors, collections of multi-faceted entities, or any combination thereof. As described above, a concept hierarchy can include one or more concepts connected by conceptual relationships, such as, for example, a parent concept/sub-concept relationship. A concept in the concept hierarchy can be, for example, one or more words or phrases present in the content of an unstructured document from the set of structured data and unstructured data. Alternatively, a concept in the concept hierarchy can be a value for a structured data element from the structured data, such as the value of a relational database field. Alternatively, a concept can be any combination of another concept, a structured data element, or the presence or absence of one or more words or phrases in the content of an unstructured data element.

At 506, a decision rule is defined based on the set of concepts and/or the concept hierarchy. As described above, a decision rule can be comprised of a concept or a set of concepts. For example, in some instances, a decision rule can include applying multiple concepts to analyze structured data and/or unstructured data stored in multiple databases associated with an inquiry. As described above, the decision rule can be generated or defined by, for example, the concept generator module of a compute device that implements a data harmonization system. Alternatively, in some instances, the decision rule can be defined by a user via a graphical user interface that allows for visual manipulation of the relationships between one or more concepts and user entry of one or more logical rules. In some configurations, one or more changes to a set of concepts and/or the concept hierarchy can be detected by the decision rule generator module, with each change being propagated through all concepts and sub-concepts that include the changed concept.

Optionally (as denoted by the dashed box) at 508, the decision rule is tested for accuracy by applying it to a known testing set of structured data and unstructured data with known outcomes or characteristics in relation to an inquiry. The testing data set can also be stored across multiple separate databases. The tests can be defined, for example, by receiving user input signals indicating the selection of one or more data elements from the testing set of structured data and unstructured data and also by, for example, receiving user input signals that indicate a desired outcome for the application of the decision rule to the testing data set. The test can be implemented by, for example, executing the decision rule on the testing set to produce a test output.

If the test output is incorrect, the decision rule can be optionally (as denoted by the dashed box) refined based on the test output, at 510. In some instances, the decision rule can be refined by receiving one or more user input signals that edit the definition of the decision rule. The updated decision rule can optionally be re-tested for accuracy, at 508, and this process of testing and refining can be repeated, for example, until a satisfactory test output is obtained and the user specifies completion of the testing and refining process.

At 512, the decision rule is executed on the set of "real" structured data and unstructured data that are stored in multiple databases to relate previously unrelated data and, for example, make a determination about the data set related to the inquiry. The execution of the decision rule on the "real" data set can be performed at for example, the determination module of the compute device that implements the data harmonization system (similar to the determination module discussed in connection with FIG. 1). The execution can be performed, for example, by substituting each concept identifier in the decision rule with a "true" or "false" signal (such as a 1 or 0), indicating the presence or absence of that concept in the set of structured data and/or unstructured data stored in multiple databases. The execution can also include, for example, recursively evaluating low-level sub-concepts in the decision rule to evaluate higher-order portions of the decision rule, until the entire decision rule has been evaluated that can, for example, lead to a final determination related to an inquiry.

At 514, the determination is presented to the user making the inquiry. In some instances, the determination can be presented to the user, for example, as an output to a display device associated with the compute device that implements the data harmonization system. The determination can be a conclusion about the contents of the set of structured data and/or unstructured data that are stored in multiple (separate) databases. In some instances, the determination can be a binary output, such as a "1" or "0" or a "yes" or "no" that indicates the presence or absence of a particular concept in the set of data. In other instances, the determination can be a recommendation for future action based on the contents of the set of data that are stored in multiple separate databases. In some instances, the determination can be output, for example, in a readable language format, such as a declarative sentence in English or another language. In other instances, the determination can be output as a data code or in another alphanumeric format.

Figure 6:
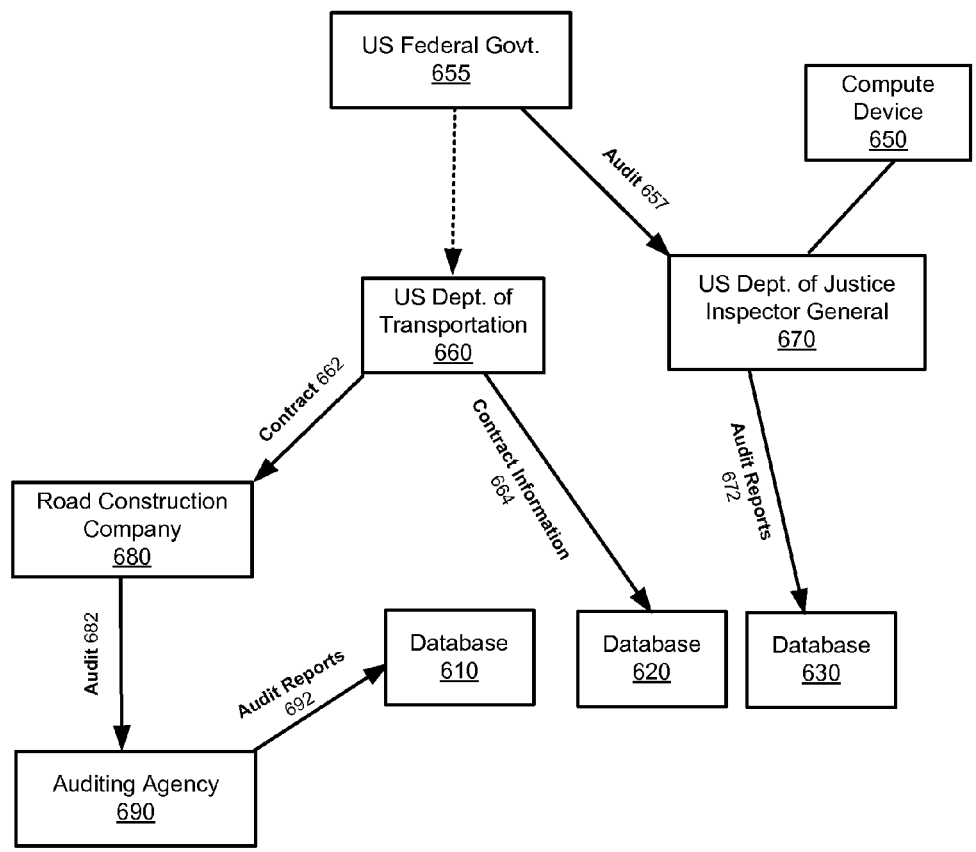
FIG. 6 is a schematic diagram that illustrates an example of an implementation of a data harmonization system to make a determination about fraudulent audit reports, according to an embodiment.

FIG. 6 is a schematic diagram that illustrates an example of an implementation of a data harmonization system to make a determination about fraudulent audit reports, according to an embodiment. Specifically, FIG. 6 includes the United States (US) Federal Government 655 and the US Federal Government 655 includes subsidiary organizations such as the US Department of Transportation 660 and the US Department of Justice Office of the Inspector General (OIG) 670. The US Department of Transportation 660 can assign contracts 662 for building new interstate highways and maintenance of existing interstate highways in, for example, northern Virginia to a road construction company 680. The US Federal Government 655 assigns the OIG 650 the task 657 of auditing all federal contracts awarded to private enterprises. The road construction company 680 can assign a (third party) auditing agency 690 the task 682 of generating audit reports for all the federal contracts received by the road construction company 680.

The Auditing Agency 690 can send a set of audit reports 692 to a database 610. The audit reports 692 can include a systematic examination of data (structured data and/or unstructured data) such as, for example, statements, records, data on operations and performances (financial or otherwise) associated with all federal contracts received by the road construction company 680. The databases 610, 620 and 630 can be, for example, a database or a look-up table stored in a random access memory (RAM), a memory buffer, a hard drive, an erasable programmable read-only memory (EPROM), an electrically erasable read-only memory (EEPROM), a read-only memory (ROM), and/or so forth.

The US Department of Transportation 660 can send data or information associated with all contracts awarded by the US Department of Transportation 620 to private enterprises across the US 664 to the database 620. The data or information associated with the contracts can include structured data and/or unstructured data sent to the database 620 via, for example, a data stream. The OIG 670 can send a set of audit reports 672 to a database 630. The audit reports 672 can include a systematic examination of data (structured data and/or unstructured data) such as, for example, statements, records, data on operations and performances (financial or otherwise) associated with all federal contracts awarded by the US Federal Government 655.

In some configurations, the data harmonization system can be included in, for example, a compute device 650 associated with the OIG 670. It should be noted that the compute device 650 that implements the data harmonization system has been shown to be associated with the OIG 670 in FIG. 6 as an example only and not a limitation. In other instances, the compute device 650 can be associated with the US Dept. of Transportation 660 and/or the road construction company 680 and/or the auditing agency 690 and/or the databases 610-630 (either one or multiple databases).

The data harmonization system can access and utilize both structured data and/or unstructured data included within the three databases 610-630 associated with the different organizations/enterprises to relate previously unrelated data and, for example, to make a determination related to an inquiry. After accessing the different sets of data from the databases 610-630, the data harmonization system can generate a set of concepts and/or a concept hierarchy by, for example, executing a concept extraction technique as described above. In some instances, the data harmonization system can also modify or edit existing concepts or set of concepts based on the data sets accessed from the databases 610-630. The data harmonization system can use the set of (generated and/or modified) concepts and/or the concept hierarchies to relate the set of previously unrelated structured data and/or unstructured data across the three databases 610-630 to track trends and exceptions that can be used, for example, to make a determinations based on the data. For example, the determination can be about potentially fraudulent audit reports generated by, for example, a specific employee (e.g., a corrupt employee, an incompetent employee, etc.) in a specific branch office of the auditing agency 690. Note that the databases 610-630 are logically separate databases. In some configurations, the databases 610-630 can be included within separate hardware devices, and in other configurations, the databases 610-630 can be included within the same hardware device.

FIG. 7A is an example of data stored in the three databases of FIG. 6, according to an embodiment. As described above, the data stored in each database 610-630 can include structured data in an organized form and/or unstructured data. The data stored in database 610 (shown in FIG. 6) can be represented, for example, by the look-up table 701. The look-up table 701 includes data stored under a report ID 710, and three characteristics associated with the data 715, 720 and 725. The three data characteristics are the name of the employee of the audit agency (e.g., audit agency 690 in FIG. 6) that filed the audit report 715, an indication of fraud included in the audit report 720, and the branch office of the audit agency that filed the audit report 725.

The data stored in database 620 (as shown in FIG. 6) is represented by the look-up table 702. The look-up table 702 includes data stored under database pointer 730, a file name 735, and three characteristics associated with the data 740, 745 and 750. The three data characteristics are the date of award of the contract 740, the award amount 745, and the geographical location where work associated with the contract is being implemented 750.

The data stored in database 630 (as shown in FIG. 6) is represented by the look-up table 703. The look-up table 703 includes data stored under a database pointer 755, and three characteristics associated with the data 760, 765 and 770. The three data characteristics are the name of the employee at the OIG that filed the audit report 760, an indication of fraud included in the audit report 765, and the branch office of the OIG that filed the audit report 770.

FIG. 7B is an example of implementing data harmonization of data stored in the three databases shown in FIG. 6, according to an embodiment. The compute device 650 shown in FIG. 6 can be the apparatus or device that implements data harmonization of the data stored in the different databases as described above.

The data harmonization system (associated with the OIG) can generate and/or define a first concept (shown as concept C1 in FIG. 7B) to locate any file or audit report across the three databases 610, 620 and 630 (shown in FIG. 6) that has been filed from branch offices in the greater Washington D.C. area (Concept C1: branch office in greater Washington D.C. area). The greater Washington D.C. area can be represented by, for example, the name of a set of cities in the specific geographical area, a name of a set of counties in the specific geographical area, a set of zip codes associated with the geographical area, a set of telephone area codes associated with the geographical area, and/or the like. The data harmonization system can analyze all the data stored in the three databases and retrieve the results of the analysis in the set of tables 810. The set of tables 810 includes the entries of the look-up tables 701, 702 and 703 shown in FIG. 7A that has been filed from branch offices in the greater Washington D.C. area.

Subsequently (or concurrently), the data harmonization system can generate and/or define a second concept (shown as concept C2 in FIG. 7B) to locate any file or audit report stored in the three databases 610, 620 and 630 (as shown in FIG. 6) that deals with work associated with federal contracts that are being implemented in the greater Washington D.C. area. (Concept C2: Location of federal contract implementation is greater Washington D.C. area). As described above, the greater Washington D.C. area can be represented by, for example, the name of a set of cities in the specific geographical area, a name of a set of counties in the specific geographical area, a set of zip codes associated with the geographical area, a set of telephone area codes associated with the geographical area, and/or the like. The data harmonization system can analyze all the data stored the three databases and retrieve the results of the analysis in the set of tables 820. The set of tables 820 includes the entries of the look-up tables 701, 702 and 703 (shown in FIG. 7A) that deals with work associated with federal contracts that are being implemented in the greater Washington D.C. area.

The set of tables 810-820 is the result of the data harmonization process that is implemented by the data harmonization system and can be used by the OIG 670 to relate previously unrelated data stored across the three separate databases 610, 620 and 630. In one example, as shown in the set of tables 830, data harmonization can reveal that Contract1 is involved with an interstate highway construction and/or maintenance work that is implemented in the greater Washington D.C. area; and has been audited by Joseph M. of the Reston Va. branch of the auditing agency; and John D. of the Washington D.C. branch of the OIG. Additionally, data harmonization can also reveal that Contract1 was associated with an award amount of $500,000; and John D. of OIG audited Contract1 and reported fraud associated with Contract1; and Joseph M. of the Reston Va. branch of the auditing agency audited Contract1 and also reported fraud associated with Contract1. In this example, the data harmonization shows no inconsistencies on audit reports associated with Contract1 that are generated by different organizations. In such cases, the OIG will not need to flag any data associated with Contract5 as potentially fraudulent or malevolent.

In another example, as shown in the set of tables 840, data harmonization can reveal that Contract5 is involved with an interstate highway construction and/or maintenance work that is implemented in the greater Washington D.C. area; and has been audited by Irene A. of the Reston Va. branch of the auditing agency; and Nancy P. of the Washington D.C. branch of the OIG. Additionally, data harmonization can also reveal that Contract5 was associated with an award amount of $3,000,000; and Nancy P. of OIG audited Contract1 and reported fraud associated with Contract5; and Irene A. of the Reston Va. branch of the auditing agency audited Contract1 and reported no fraud associated with Contract5. In this example, the data harmonization shows inconsistencies on audit reports associated with Contract5 that are generated by different organizations. In such cases, the OIG can flag all data associated with Contract5 as potentially fraudulent or malevolent. The data harmonization process can allow further determinations regarding Contract5 to be made by the OIG such as, for example, identifying the branch office of the auditing agency that is the source of the fraudulent audit reports (e.g., Reston Va.), identifying the employee of the auditing agency that generated the potentially fraudulent audit report (e.g., Irene A.), identifying the employee of the OIG that is associated with detection of fraudulent audit reports (e.g., Nancy P.), and/or the like. Note that in some instances, subsequent concepts (not shown in FIG. 7B) can be defined and/or generated by the data harmonization system and applied to, for example, table 810 and 820 to narrow the information associated with an inquiry in order to increase the accuracy of a determination.

Figure 8A:
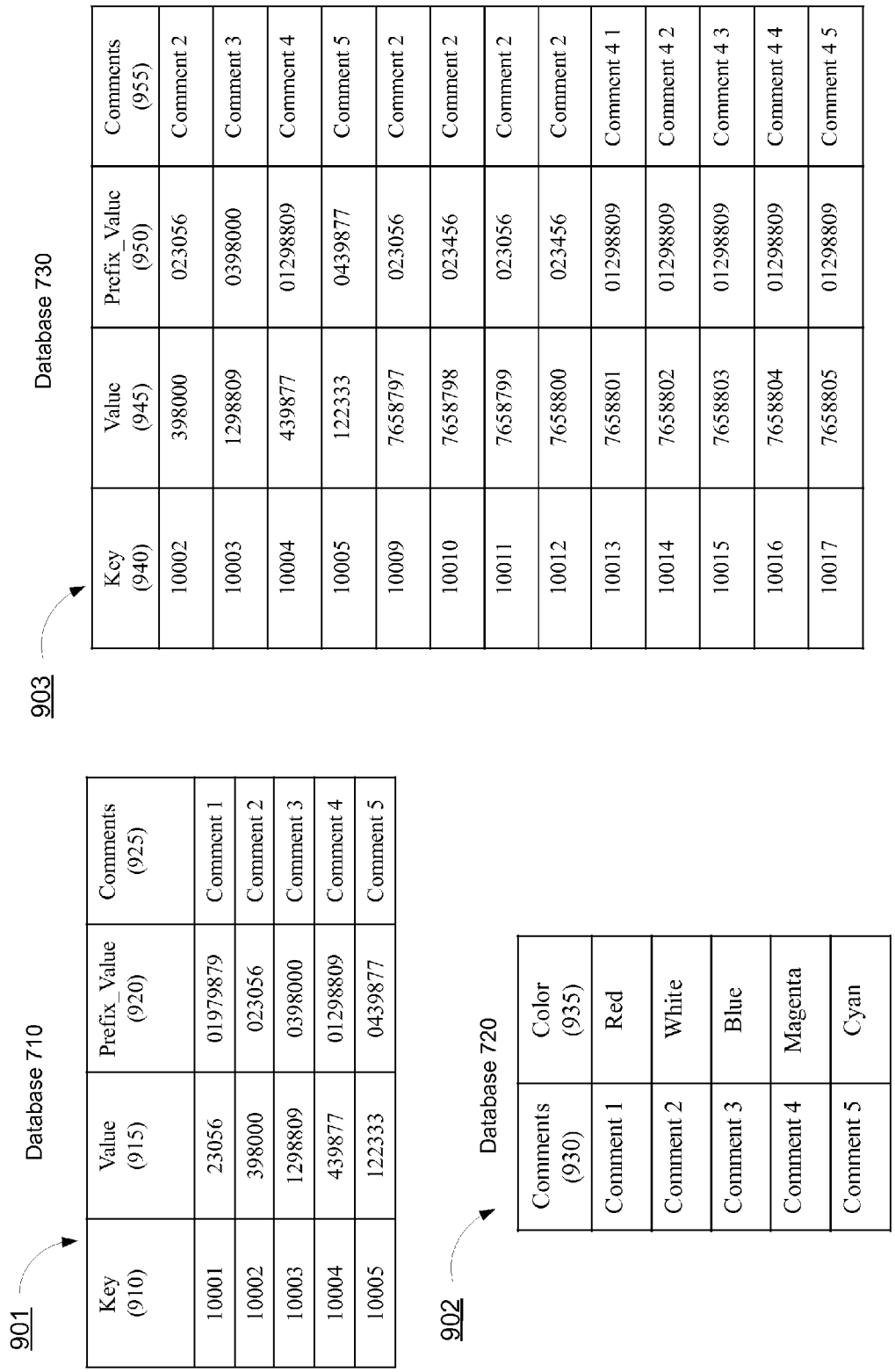
FIG. 8A is an example of data stored in three exemplary databases, according to an embodiment.

FIG. 8A is an example of data stored in three exemplary databases, according to an embodiment. As described above, the data stored in each database 710-730 can include structured data in an organized form and/or unstructured data. The data stored in database 710 can be represented, for example, by the look-up table 901. The look-up table 901 includes data stored under a key column 910, a value column 915, a prefix_value column 920, and a comments column 925. The data stored in database 720 can be represented, for example, by the look-up table 902. The look-up table 902 includes data stored under a comments column 930, and a color column 935. The data stored in database 730 can be represented, for example, by the look-up table 903. The look-up table 903 includes data stored under a key column 940, a value column 945, a prefix_value column 950, and a comments column 955. Note that in the examples of FIGS. 8A-8D, it is possible to add prefixes and/or suffixes to any of the data stored in tables 901-906 for successfully implementing any data harmonization steps.

FIG. 8B is an example of implementing data harmonization of data stored in database 710 to itself, according to an embodiment. The data in database 710 is harmonized to itself by a first concept D1 that is defined and/or generated by the data harmonization system, where D1 can be defined as: (D1: Add "0" as prefix to Value (915)=Prefix_Value (920)). The data harmonization system can analyze the data stored database 710 by applying concept D1 to all the data stored in database 710, and retrieve the results of the harmonization process in look-up table 904. The entries of look-up table 904 include data in database 710 that has been harmonized using the concept D1.

Subsequently (or concurrently) after the first data harmonization step (see FIG. 8B), the data harmonization system can generate and/or define a second concept D2 that can find the corresponding color associated with the comments (925) in table 904 in FIG. 8B by harmonizing the data in table 904 with the data in database 720 (i.e., look-up table 902 in FIG. 8A). Comment D2 can be defined and/or generated by the data harmonization system as: (D2=Match comments column (925) in table 904 with the comments column (930) in look-up table 902). FIG. 8C is an example of implementing a data harmonization of data stored in database 720 to the data stored in table 904, according to an embodiment. Note the left most comments column (925) in table 904 is used in the data harmonization process and the results of said harmonization process are included in table 905 as shown in FIG. 8C.

Subsequently (or concurrently) after the second data harmonization step (see FIG. 8C), the data harmonization system can generate and/or define a third concept D3 as: (D3: Add "0" as prefix to Value (915)=Prefix Value (950)) to harmonize data stored in database 710 (look-up table 901) with data stored in database 730 (look-up table 903). The data harmonization system can analyze the data stored database 710 and database 730 by applying concept D3 to all the data stored in database 710 and database 730, and retrieve the results of the harmonization process in look-up table 906 as shown in FIG. 8D. FIG. 8D is an example of implementing data harmonization of data stored in database 710 to the data stored in database 730, according to an embodiment. The entries of look-up table 906 include data in database 710 and database 730 that has been harmonized using the concept D3. Note that in some instances, a row with a specific value (915) in database 710 harmonizes with multiple rows in database 730 that has the related prefix_value (950) as defined by concept D3.

In some instances, the data harmonization system can concatenate or combine the data stored in multiple columns or rows in a table (e.g., part of a database associated with a data source) into a single column or row if a specific use case (e.g., applying a particular concept to the data stored in the multiple columns) is facilitated by the concatenation. Such a concatenation or combination step can be performed multiple times if demanded. In such instances, the new concatenated data can either be stored in an existing table or a new table created for storing the results of the concatenation steps. For example, in relation to FIGS. 8A-8C, the data harmonization system can apply concept D2 to match comments column (925) in table 904 with the comments column (930) in look-up table 902 to generate the table 905 as shown in FIG. 8C.

In such instances, the data stored in any of the column(s) selected in the concatenation step can be concatenated into, for example, a single string for comparison with the data stored in the columns of tables associated with a target data source (e.g., a target database). In such instances, the data stored in the columns of the new table (e.g., table 905 in FIG. 8C) can be concatenated into one string for comparison. Additionally, if there are multiple data points (or data values) stored in each cell of a column in the new table, then each data point in a cell will be concatenated with the corresponding data point in each subsequent cell in the new table.

In some instances, the comparison of data stored in different column(s) can be performed using, for example, a "contains" operation. In such instances, matches will be based on data stored in, for example, a first column(s) from a first data source that can be a substring of or contained within the data stored in, for example, a second column(s) from a second data source and vice versa. In one example, a "contains" based operation can involve a first column(s) that includes only street names such as "University Blvd", and a second column(s) that includes house numbers and street names such as "123 University Blvd". In such cases, a "contains" based comparison will produce a match. However, if the second column(s) included the house numbers and street names as "123 University Boulevard", a "contains" based comparison would not directly match "University Blvd" with "123 University Boulevard". In another example, a "contains" based operation can involve a first column(s) that includes the serial number '063289', and a second column(s) that includes the number '6328'. In such cases, a "contains" based comparison will produce a match. However, if the second column(s) included the number value is '6329', a "contains" based comparison would not directly match "063289" with "6329". It is to be noted that in such instances, the "contains" operation can be either case-sensitive or case-insensitive.

In other instances, the data harmonization system can allow a user can use prefix and suffix operations to build a new comparison string from column(s) or rows selected for harmonization (e.g., as shown in FIGS. 8A-B). This feature can be useful, for example, when in a first data source, an unstructured data set is stored as a set of entries such as "serial number 345090", and in a second data source (that can be a table), structured data can be stored in a table with, for example, a column titled 'HY02CONFIGURATION' that can include a serial number 345090. In order to relate these two different data sources, the data harmonization system can setup the harmonization as follows.

In such instances, the data harmonization system can apply, for example, a concept to choose a column of unstructured data from the first data source. The data harmonization system can return values from the first data source such as, for example, "serial number 345090", "serial number 793248", etc. These values or data points are then to be matched with the 'HY02CONFIGURATION' column of the second data source that might contain stored data points or values such as, for example, 345090, 793248 etc. In such instances, the data harmonization system can add the prefix "serial number" before every data value or data point stored in each cell of the 'HY02CONFIGURATION' column.

Thus, in this example, the data harmonization system can match the output of any document from the first data source with the contents of the 'HY02CONFIGURATION' column of the second data source containing an entry prefixed by the string "serial number". In some instances, the data harmonization system can affix multiple prefixes and/or suffixes to the data from either the first data source and/or the second data source to harmonize the data. In such instances, the prefix term and the suffix terms added to the data can be non-identical. Additionally, the data harmonization system can be configured to add different prefixes and suffixes to different data sets. For example, in some instances, every even numbered column entry in the 'HY02CONFIGURATION' column of the second data source can be associated with a first set of prefixes and/or suffixes, and every odd numbered column entry in the 'HY02CONFIGURATION' column of the second data source can be associated with a second set of prefixes and/or suffixes, where the first set of prefixes and/or suffixes is non-identical to the second set of prefixes and/or suffixes. It should be noted that the suffix operation is similar to the prefix operation and both such operations can be either case-sensitive or case-insensitive.

In some instances, the data harmonization system can present the results of the harmonization (i.e., data harmonization output) as a set of active hyperlinks. In such instances, as long as the user is actively logged into the data harmonization system (and is in the correct workspace), the user can click on any of the hyperlinks in the set to launch a result(s) page with the highlighted result(s). The harmonized data output can be in different form, for example, in different combinations of output data sorted by file type and different combinations of output data sorted by export type.

Data harmonization output to xlsx files is typically constrained by Microsoft® Excel (MS Excel) product restrictions. The different forms of harmonized data output can have different limitations that might impact the output of the data harmonization analysis. Output to csv (comma separated values) files does not have restrictions on size or other related constraints. The output to csv files is typically faster as MS Excel formatting of characters (that takes up significant processing bandwidth) is avoided. However, if the size of output csv file exceeds 2GB, MS Excel, the typical default viewer for csv files in many installations, may not load the output file. In some cases, the client system (i.e., the device that implements the data harmonizing system and/or the device that downloads the harmonization output file) can even abort while the user is trying to download the harmonization output file. Hence, alternative methods to view the harmonization output files (i.e., in addition to xlsx and csv files) and/or run the data harmonization process can be useful based on the needs of the data harmonization. For example, one alternative can be to run the data harmonization in discrete chunks by limiting data sources and/or filters. It is to be noted that data harmonization export files can be large. Hence, the device that implements the data harmonization (e.g., the compute device 150 in FIG. 1) typically exports only the rows and/or columns that were harmonized amongst disparate data sources. The user can optionally choose to include the different sets of source data that can, however, increase the size of the output file significantly.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. For example, while three separate databases are shown in FIGS. 3 and 6, in other instances, the data harmonization system can be used to harmonize data stored in either less than three separate databases or more than three separate databases and/or different sections of the same database. In another example, while the three databases in FIGS. 3 and 6 have been shown as capable of storing both structured data and/or unstructured data, in other instances, the data harmonization system can be used to harmonize data stored in databases that can store only exclusively structured data or only exclusively unstructured data. The data harmonization system described herein have particular applicability for information identification, gathering, and analysis and can be applied in a variety of sectors such as, for example, economic sector, financial sector, high-technological sector, sociological sector, informatics, educational and learning sector, national security sector, crime fighting sector, and/or the like.

Exemplary embodiments are described with reference to specific structural and methodological embodiments and configurations. Those workers having ordinary skill in the art in light of the description provided here will appreciate that various changes and modifications can be made while remaining within the scope of the invention. For example, the categorization process can be presented in a preferred order utilizing preferred (Gaussian) statistics; however, ordering the steps differently or utilizing a different statistical methodology could achieve the same or analogous end. Examples of relational database tables are given, but those skilled in the art will appreciate that these tables could be structured differently and remain within the scope of the invention. Other variations, changes, and/or modifications may be made without departing from the scope of the invention.

What is claimed:

1. A processor-implemented method, comprising:
    accessing, via an at least one processor, a first database including a plurality of first data objects, the plurality of first data objects associated with at least a first identifier type, a first characteristic type, a second characteristic type, each first data object from the plurality of first data objects having at least one of a value associated with the first identifier type, a value associated with the first characteristic type or a value associated with the second characteristic type;
    accessing, via the at least one processor, a second database separate from the first database and including a plurality of second data objects unrelated to the plurality of first data objects, the plurality of second data objects associated with at least the second identifier type, the second characteristic type, and a third characteristic type, each second data object from the plurality of second data objects having at least one of a value associated with the second identifier type, a value associated with the third identifier type, and/or a value associated with the second characteristic type;

applying, via the at least one processor, a business rule to the plurality of first data objects and to the plurality of second data objects, the business rule being a logical expression indicating a relationship between a first concept and a second concept, the first concept being a logical expression indicative of the presence of a selected value of the first characteristic type and the second concept being a logical expression indicative of the presence of a selected value of the second characteristic type, the first concept and the second concept each representing a real world observation or a word or phrase conveying an idea or meaning;

identifying, via the at least one processor, each first data object from the plurality of first data objects and each second data object from the plurality of second data object that satisfy the business rule to define a list of identified first data objects and a list of identified second data objects;

identifying, via the at least one processor, a relationship between a value of the first identifier type of an identified first data object from the list of identified first data objects with a value of the third characteristic type of an identified second data object from the list of identified second data object based on the value of the second identifier type of the identified second data object matching a value of the first identifier type of the identified first data object;

harmonizing, via the at least one processor, at least one of the identified relationships and the identified data objects to identify any inconsistencies; and issuing, via the at least one processor, an alert to a graphical user interface based on an identification of at least one inconsistency, the alert including an identifier indicating the at least one inconsistency.

2. The processor-implemented method of claim 1, wherein the first characteristic type is one of a date a file was created, the name of an individual that created the file, the address of an organization where the file was created, a branch number of the organization where the file was created, an indication of fraud detected with the file, a database pointer for a database where the file is stored.

3. The processor-implemented method of claim 1, wherein the identified first data object is a first identified first data object and the identified second data object is a second identified first data object, the method further comprising:

identifying, via the at least one processor, a relationship between a value of the first identifier type of a second identified first data object from the list of identified first data objects with a value of the third characteristic type of a second identified second data object from the list of identified second data objects based on (1) the value of the second identifier type of the second identified second data object matching a value of the first identifier type of the second identified first data object.

4. The processor-implemented method of claim 1, wherein the plurality of first data objects are associated with a fraud indicator, and each first data object from the plurality of first data objects has a value associated with the fraud indicator, and the plurality of second data objects are associated with a fraud indicator, and each second data object from the plurality of second data objects has a value associated with the fraud indicator, the method further comprising:

sending, via the at least one processor, an alert in response to an inconsistency between a value of the fraud indicator of the identified first data object and a value of the fraud indicator of the identified second data object.

5. The processor-implemented method of claim 1, wherein the first concept is a logical expression indicative of the presence of a selected value of the first characteristic type as a text string in an unstructured data object or as data code stored in a structured data object.

6. The processor-implemented method of claim 1, wherein the first concept is a logical expression indicative of the presence of any value of the first characteristic type as a text string in an unstructured data object or as data code stored in a structured data object.

7. A processor-implemented method, comprising:

accessing, via an at least one processor, (1) a first data set, the first data set including structured data and unstructured data that is stored in at least a first database, (2) a second data set, the second data set including structured data and unstructured data that is stored in at least a second database, and (3) a third data set, the third data set includes structured data and unstructured data that is stored in at least a third database;

defining, via the at least one processor, a first concept being a logical expression indicating a presence of a text string in an unstructured data object, or a data code stored in a structured data object, from the first data set, the second data set or the third data set;

defining, via the at least one processor, a second concept being a logical expression indicating a presence of a text string in an unstructured data object, or a data code stored in a structured data object, from the first data set, the second data set or the third data set;

defining, via the at least one processor, a business rule to include a logical expression indicating a relationship between the first concept and the second concept; and if, in response to applying, via the at least one processor, the business rule to the first data set, the second data set, and the third data set, a first data object, a second data object, and a third object each satisfy the business rule:

defining, via the at least one processor, a combined entry including the first data object, the second data object and the third data object; and in response to a determination that data included within the first data object is inconsistent with data from the second data object or with data from the third data object, sending over a communications network, via the at least one processor, a visual alert signal indicative of flag of the data included within the first data object.

8. The processor-implemented method of claim 7, further comprising:

if, in response to applying the business rule to the first data set, the second data set, and the third data set, the first data object and the second data object each satisfy the business rule:

defining, via the at least one processor, a combined entry including the first data object and the second data object; and in response to a determination that data included within the first data object is inconsistent with data from the second data object, sending, via the at least one processor, a signal indicative of flag of the data included within the first data object.

9. The processor-implemented method of claim 7, wherein the first data set satisfies the business rule when the data included within first data set satisfies at least one of the first concept or the second concept.

10. The processor-implemented method of claim 9, wherein the first concept is satisfied when a characteristic associated with the data included within the first data object matches a selected text string.

11. The processor-implemented method of claim 7, wherein the first data set does not satisfy the business rule when the data included within first data set does not satisfy the first concept and the second concept.

12. (Previously Presented The processor-implemented method of claim 7, wherein:
the data included within the first data object includes a category corresponding to a category included within the data that is included within the second data object, and
the data included within the first data object is inconsistent with data from the second data object when a value associated with the category of the first data object is different than a value associated with the category of the second data object.

13. The processor-implemented method of claim 7, wherein applying the business rule includes:
hashing, via the at least one processor, a plurality of characteristics associated with the first data set to define a plurality of hashed characteristics associated with the first data set;
comparing the plurality of hashed characteristics associated with the first data set to the plurality of hashed characteristics associated with the second data set.

14. An apparatus, comprising:
a processor configured to be operatively coupled to a memory and configured to execute a determination module; and
the determination module configured to be operatively coupled to (1) a first database that includes a first data object, the first data object including at least one of a first identifier type, a second identifier type, and a first characteristic type, (2) a second database that includes a second data object, the second data object including at least one of the second identifier type, a third identifier type, and a second characteristic type, and (3) a third database that includes a third data object, the third data object including at least one of the third identifier type, and a third characteristic type;
the determination module configured to receive an indication of the selection of (1) the first database, the second database and the third database, and (2) a business rule, the business rule being a logical expression indicating a relationship between a first concept and a second concept, the first concept being a logical expression indicative of the presence of a selected value of the first characteristic type and the second concept being a logical expression indicative of the presence of a selected value of the second characteristic type;
the determination module configured to, in response the indication of the selection, apply the business rule to the first database, the second database, and the third database;
the determination module configure to send over a communications network, in response to (1) the first data object satisfying the first concept and (2) the second data object satisfying the second concept, to the first database, a report indicating a relationship between the first data object, the second data object and the third data object, the report configured for display on a graphical user interface, the report including at least one alert corresponding to an inconsistency when at least one inconsistency is identified by the determination module.

15. The apparatus of claim 14, wherein the determination module is configured to identify a relationship between a value of the first characteristic type of the first data object with a value of the third characteristic type of the third data object based on (1) the value of the second identifier type of the second data object matching a value of the second identifier type of the second data object, and (2) a value of third identifier type of the second data object matching a value of third identifier type of the third data object.

16. The apparatus of claim 14, wherein the first characteristic type is one of a date a file was created, the name of an individual that created the file, the address of an organization where the file was created, a branch number of the organization where the file was created, an indication of fraud detected with the file, a database pointer for a database where the file is stored.

17. The apparatus of claim 14, wherein:
the first data object includes an indication of fraud type,
the third data object includes an indication of fraud type,
the determination module configured to send an alert in response to the an inconsistency between a value of the indication of fraud type associated with the first data object and a value of the indication of fraud type associated with the second data object.

18. The apparatus of claim 14, wherein the determination module is configured to define a combined data object that includes the first identifier type, the second identifier type, the third identifier type, the first characteristic type the second characteristic type, and the third characteristic type.

19. The apparatus of claim 14, wherein the first concept is a logical expression indicative of the presence of a selected value of the first characteristic type as a text string in an unstructured data object or as data code stored in a structured data object.

20. The apparatus of claim 14, wherein the first concept is a logical expression indicative of the presence of any value of the first characteristic type as a text string in an unstructured data object or as data code stored in a structured data object.

* * * * *